United States Patent [19]
Watanabe et al.

[11] Patent Number: 5,392,074
[45] Date of Patent: Feb. 21, 1995

[54] LEVEL DETECTION CIRCUIT AND ACC CIRCUIT EMPLOYING THE LEVEL DETECTION CIRCUIT

[75] Inventors: Kazuo Watanabe, Chiba; Hirofumi Todo, Tokyo; Takaya Hoshino, Saitama, all of Japan

[73] Assignee: Sony Corporation, Tokyo, Japan

[21] Appl. No.: 65,155

[22] Filed: May 21, 1993

[30] Foreign Application Priority Data

Jun. 4, 1992 [JP] Japan ................. 4-144347

[51] Int. Cl.[6] ............................... H04N 9/64
[52] U.S. Cl. ......................... 348/647; 348/645; 348/506
[58] Field of Search ............. 358/28, 27, 19, 40, 358/21 R; H04N 9/64; 348/505, 506, 645, 646, 647, 710, 713

[56] References Cited

U.S. PATENT DOCUMENTS

| | | | |
|---|---|---|---|
| 4,092,667 | 5/1978 | Akazawa et al. | 358/27 |
| 4,398,209 | 8/1983 | Robitzsch | 358/27 |
| 4,523,223 | 6/1985 | Lüder et al. | 358/27 |
| 4,679,072 | 7/1987 | Takayama | 358/27 |

*Primary Examiner*—Victor R. Kostak
*Assistant Examiner*—Glenton B. Burgess
*Attorney, Agent, or Firm*—Jay H. Maioli

[57] ABSTRACT

A level detection circuit includes a multiplier and an adder for computing the sums of square values of a burst signal. A maximum value holding circuit holds a maximum value of the sums of the squared values of the burst signal. A counter counts sampling clocks. A multiplier, an adder and a $\frac{1}{2}$ processing circuit compute a half value of the sum of two consecutive count values, and a delay circuit, a latch circuit and a comparator generate a first one of the two consecutive count values as a level of the burst signal when an output of the $\frac{1}{2}$ processing circuit becomes larger than the output of the maximum value holding circuit. The invention enables level detection by finding a square value using a small circuit.

10 Claims, 7 Drawing Sheets

LEVEL DETECTION CIRCUIT AND ACC CIRCUIT EMPLOYING THE LEVEL DETECTION CIRCUIT

BACKGROUND OF THE INVENTION

This invention relates to a level detection circuit for detecting the signal level of input signals and, more particularly, to such a circuit employed in an automatic color saturation control (ACC).

A television receiver or the video tape recorded, for example, is provided with an automatic Color saturation control (ACC) circuit. In the television receiver, if the level difference between luminance signals and the carrier chrominance signals fluctuates because for example of fluctuations in the received electrical waves or mismatching of an antenna system, saturation on a display screen is changed in an irregular manner. Besides, solely the color saturation may be changed by channel switching. Consequently, the aforementioned ACC circuit is built into the television receiver for automatically adjusting the gain of the bandwidth amplifying circuit which is operated for maintaining a constant level of the carrier chrominance signals applied to a demodulation circuit. The ACC circuit, which compares a burst amplitude value to a reference value for controlling the gain for maintaining the color saturation at all times at a constant level, is arranged as shown for example in FIG. 1.

In this figure, carrier chrominance signals are supplied to an input terminal 21 of the ACC circuit and thence supplied to a level detection circuit 25 via a multiplier 23. The level detection circuit 25 detects the level of the carrier chrominance signals. Since the chroma level is determined by the level of a burst signal, the level detection circuit 25 detects the level of the carrier chrominance signal, that is the burst amplitude, when a burst gate pulse supplied via terminal 22 from a sync deflection block of the television receiver is at e.g. a high "H" level.

The ACC circuit decides a loop gain by integrating the difference between the level detection output from the level detection circuit 25 and a reference. That is, with the present ACC circuit, the level detection output of the level detection circuit 25 is supplied as an additive signal to an additive node 26 also supplied with a predetermined reference value as a subtractive signal from a level reference value generating circuit 28. A difference output between the level reference value and the level detection output is produced by the additive node 26 so as to be supplied to an integrating circuit 27. An integrated output of the integrating circuit 27 is supplied as a multiplication coefficient to the multiplier 23. The carrier chrominance signal from multiplier 22 is multiplied by the multiplication coefficient from the integrating circuit 27. A multiplication signal from multiplier 23 is outputted as ACC output at an output terminal 24 so as to be supplied to a downstream decoder, not shown.

The aforementioned burst gate pulse is generated in the following manner. For example, horizontal synchronization signal $H_{SY}$ is extracted from a composite video signal shown in FIG. 2, by a sync separator, not shown, provided within the deflection system. The horizontal synchronization signal $H_{SY}$ is differentiated, as shown in FIG. 3, and a rising part of the differentiated waveform is cut along a threshold value $V_{TH}$ for producing the aforementioned burst gate pulse which is a pulse having a position corresponding to the burst, period.

Meanwhile, in the above-mentioned level detection circuit 25, shown in FIG. 1, a square root value is found for finding the burst amplitude of the color chrominance signals. Typical of the prior-art arrangements for finding the square root is an arrangement employing a read-only memory (ROM).

However, if higher precision in square root calculation is desired in the arrangement for finding the square root by ROM, the number of address bits of ROM and the number of bits of data stored in ROM are increased so that a ROM of larger capacity is required and hence the circuit is undesirably increased in size.

SUMMARY OF THE INVENTION

In view of the above-depicted state of the prior art, it is an object of the present invention to provide a level detection circuit whereby level detection can be made by finding a square root by a circuit having a smaller circuit size.

It is another object of the present invention to provide an ACC circuit which has improved precision despite the small circuit size.

Each of the foregoing and additional objects are achieved by the provision of a level detection circuit and an ACC circuit employing the level detection circuit according to the present invention.

In its one aspect, the present invention provides a level detection circuit for detecting a level of input signals comprising a first square value computing means for computing a squared value of the input signal level, count means for counting predetermined clocks, second square value computing means for computing a square of a count value of the count means, and level decision means for outputting the level of the input, signals as the count value of the count means when an output of the second square value computing means exceeds an output of the first square value computing means.

In another aspect, the present invention provides a level detection circuit for detecting a level of input signals comprising a first square value computing means for computing a square of the input signal level, count means for counting predetermined clocks, second square value computing means for computing a half value of the sum of two consecutive count values of the count means, and level decision means for outputting the level of the input signals when an output of the second square value computing means exceeds an output of the first square value computing means.

In still another aspect, the present invention provides a level detection circuit for detecting the level of a burst signal comprising an A/D converter for sampling the burst signal having a frequency $f_{SC}$ with sampling clocks having a frequency of 4 $f_{SC}$, a first square value computing means for computing the sum of square values of two consecutive output data of the A/D converter, a maximum value holding circuit for holding a maximum value of outputs of the first square value computing means within a burst pulse period, count means adapted for counting the sampling clocks and being reset by the burst gate pulse, second square value computing means for computing a half value of the sum of two consecutive count values of the count means outside the burst gate pulse period, and level decision means for outputting a first one of the two consecutive count values as a level of the burst signal when an output of the second square value computing means becomes larger than the output of the maximum value holding means.

In yet another aspect, the present invention provides an ACC circuit comprising multiplication means for multiplying an image signal containing a burst signal having a frequency $f_{SC}$ with a predetermined coefficient, an A/D converter for sampling an output of the multiplication means with sampling clocks having a frequency of 4 $f_{SC}$, first square value computing means for computing the sum of squared values of two consecutive output data of the A/D converter, a maximum value holding circuit for holding a maximum value of outputs of the first square value computing means within a burst pulse period, count means adapted for counting the sampling clocks and for being reset by the burst gate pulse, second square value computing means for computing a half value of the sum of two consecutive count values of the count means outside the burst gate pulse period, level decision means for outputting a first one of the two consecutive count values as a level of the burst signal when an output of the second square value computing means becomes larger than the output of the maximum value holding means, addition means for adding an output of the level decision means to a predetermined reference signal, and integrating means for integrating an output of the addition means for generating the predetermined coefficient.

The above and other objects, features and advantages of the present invention will be apparent from the following detailed description of preferred embodiments when read in conjunction with the accompanying drawings, in which like reference numerals are used to identify the same or similar parts in the several views.

DETAILED DESCRIPTION OF THE INVENTION

Figure 1:
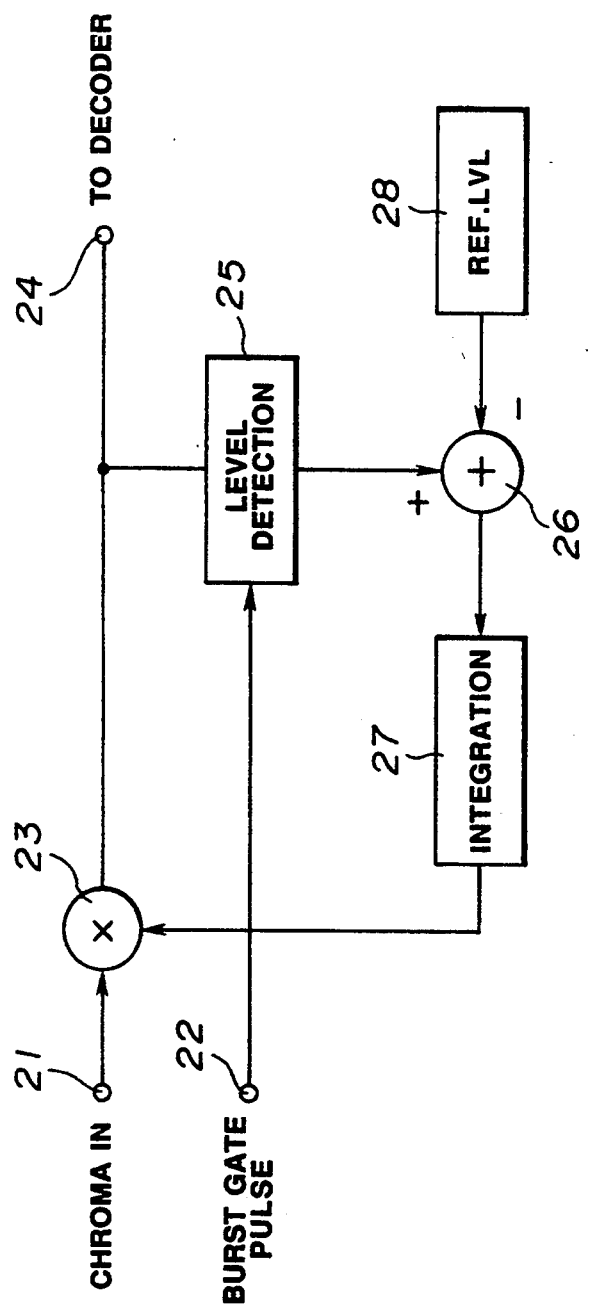
FIG. 1 is a schematic block circuit diagram showing an arrangement of a conventional ACC circuit.
Figure 2:
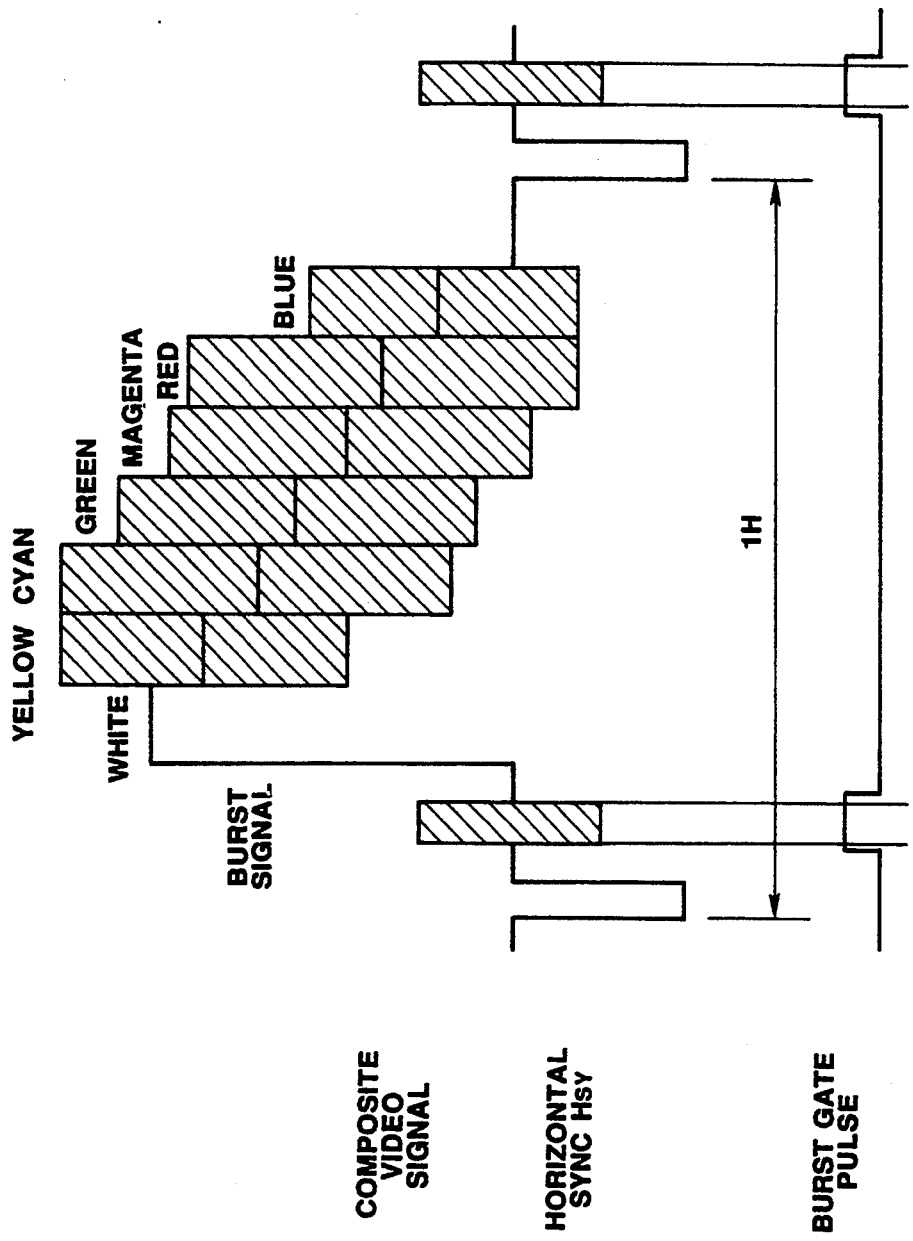
FIG. 2 is a waveform diagram for illustrating a composite video signal and a burst gate pulse.
Figure 3:
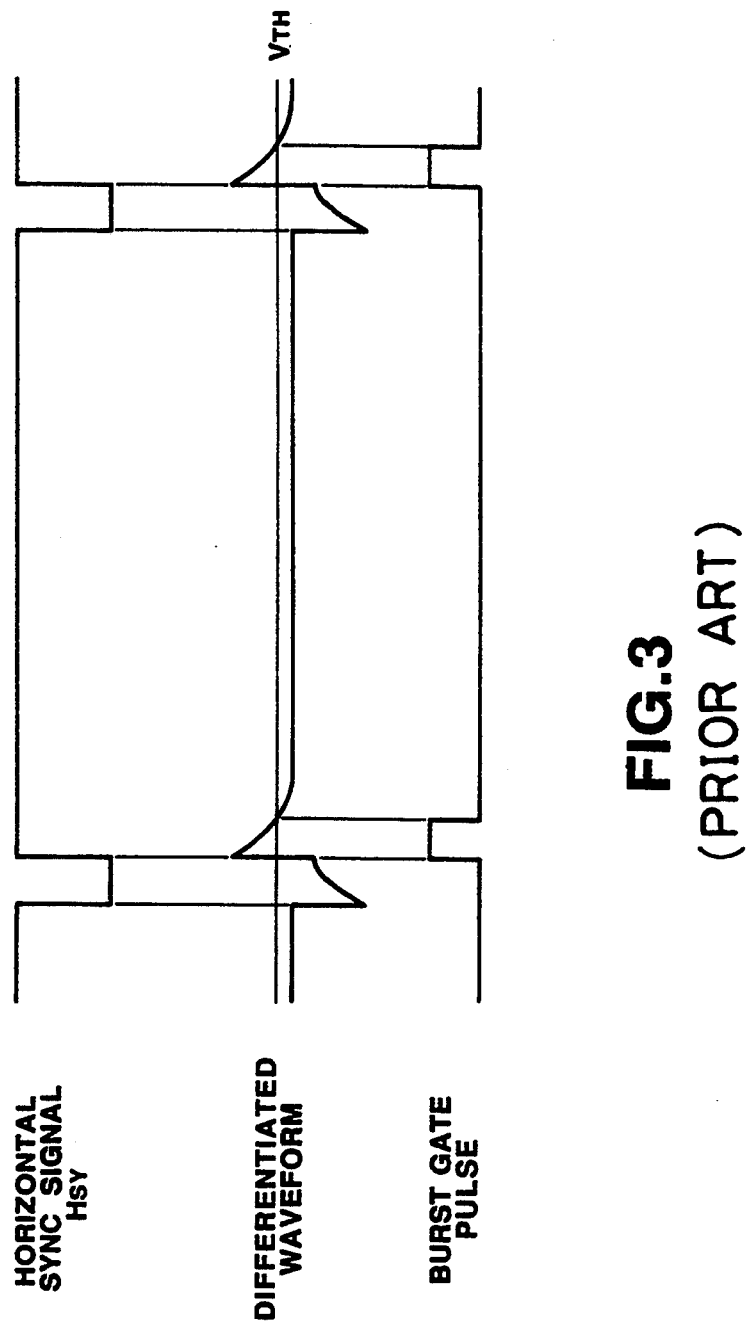
FIG. 3 is a waveform diagram for illustrating a method for generating the burst gate pulse shown in FIG. 2.

Referring to the drawings, preferred embodiments of the present invention will be explained in detail.

The level detection circuit of the present embodiment is employed as a level detection circuit for e.g. the above-mentioned ACC circuit.

The level detection circuit for detecting a level of input signals according to a preferred embodiment of the present invention comprises first square value computing means for computing a squared value of input signals, count means for counting predetermined clocks, second square value computing means for computing a square value of a court% value of the count means, and level decision means for outputting the level of the input signals as the count value of the count means when an output of the second square value computing means exceeds an output of the first square value computing means.

That is, the level detection means embodying the present invention comprises, besides the first square value computing means and the count means, second square value computing means for computing a half value of the sum of two consecutive count values of the count means, and level decision means for outputting the level of the input signals when an output of the second square value computing means exceeds an output of the first square value computing means.

Figure 4:
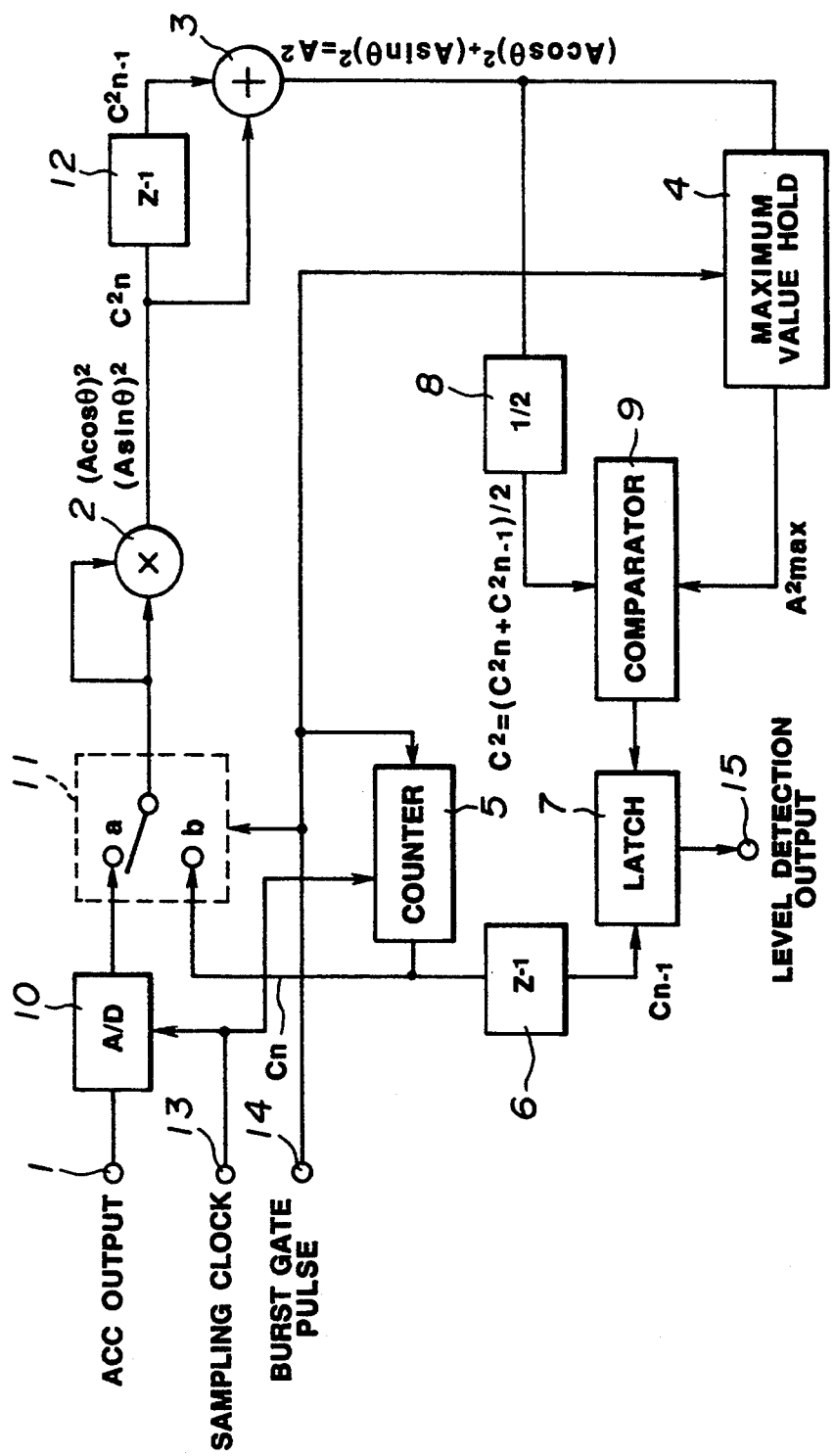
FIG. 4 is a schematic block circuit diagram showing an arrangement of a level detection circuit according to the present invention.
Figure 5:
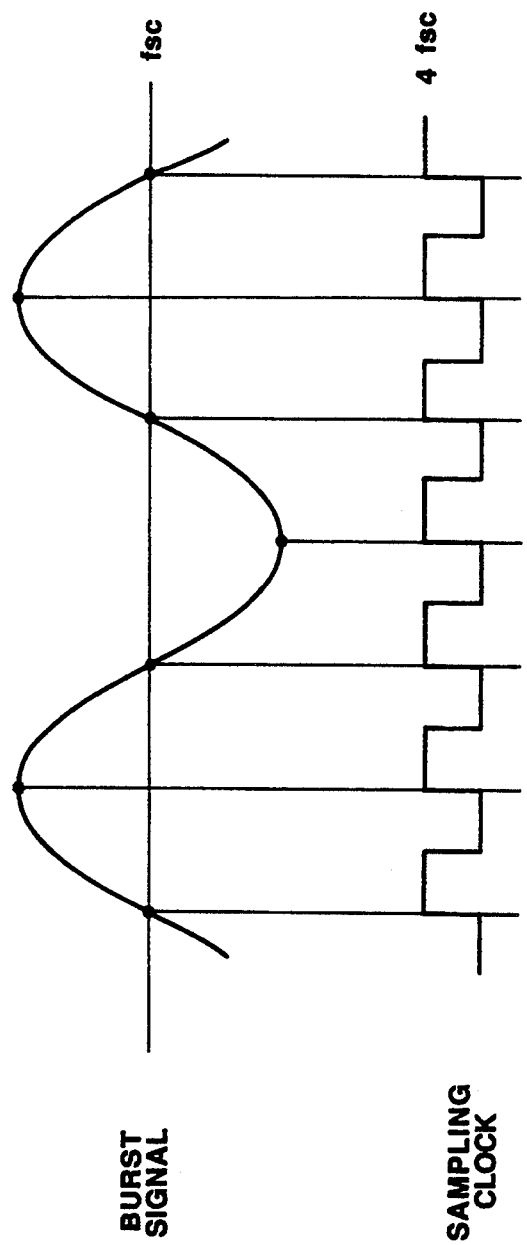
FIG. 5 is a waveform diagram for illustrating the manner of sampling of burst signals.

Specifically, the level detection circuit according to the present embodiment comprises, as shown in FIG. 4, a multiplier 2 and an additive node 3, as first square value computing means, for computing the sum of square values of two consecutive data of a burst signal of a frequency $f_{SC}$ sampled with sampling clocks of a frequency 4 $f_{SC}$, a maximum value holding circuit 4 for holding a maximum value of outputs of the first square value computing means within a burst gate pulse period, a counter 5 adapted for counting the sampling clocks and being reset by the burst gate pulse, a multiplier 2, additive node 3 and a ½ processing circuit 8, as second square value computing means, for computing a half value of the sum of two consecutive count values of the counter 5 outside the burst gate pulse period, and a delay circuit 6, latch circuit 7 and a comparator 9, as level decision means, for outputting a first one of the two consecutive count values as an approximate value of the level of the burst signal, that is as an approximate value of a square root, when an output of the second square value computing means becomes larger than the output of the maximum value holding means.

In FIG. 4, an output signal of the multiplier 23 of FIG. 1 supplied to an input terminal 1 (ACC output signal) is supplied to a fixed terminal a of a selector 11 via an 8-bit analog/digital (A/D) converter 10 which is operated based on a sampling clock of a sampling frequency of 4 $f_{SC}$ supplied from terminal 13. This selector 11 is switched over responsive to the burst gate pulse supplied to terminal 14. Specifically, the selector 11 has its movable contact set to the fixed terminals a and b when the burst gate pulse is "H" and "L", respectively.

When the burst gate pulse becomes "H" so that the selector 11 is set to the side of the fixed terminal a, the sampled ACC output data is transmitted to multiplier 2 via selector 11. The multiplier 2 squares the ACC output data supplied thereto to find a square value which is supplied to an additive node 3. The additive node 3 is also supplied with an output of the multiplier 2 via a delay circuit $Z^{-1}$ which delays an input signal by one clock. Thus the sum of two squared consecutive ACC output data is found by additive node 3.

That is, in the present embodiment, if the frequency of the burst signal is the above-mentioned frequency $f_{SC}$ and the frequency of the sampling clocks is 4 $f_{SC}$, the phase difference between adjacent data, that is the phase difference between two adjacent sampled data, becomes equal to 90°. Thus, if the amplitude of the burst signal is A and an arbitrary data in this domain is A cos Θ, a data preceding the arbitrary data A cos Θ is A sin Θ. In other words, if the amplitude of the burst signal is A and a reference sampling data is A sinΘ, the next following sampling data becomes $$A \sin(\Theta + 90°) = A \cos \Theta \quad (1)$$

If these two data are squared by multiplier 2 and the squared values are summed together at the additive node 3, the result becomes equal to $A^2$ as shown by the following formula (2)

$$(A \cos \Theta)^2 + (A \sin \Theta)^2 = A^2 \qquad (2)$$

In this manner, the sum of the squared values of the two consecutive ACC output data, that, is the squared value of the burst level, is produced.

The squared value $A^2$ of the burst, level from additive mode 3 is supplied to the maximum value holding circuit 4. The maximum value holding circuit 4 is operated responsive to the burst gate pulse and holds a maximum value $A^2_{max}$ among plural squared values $A^2$ from the additive node 3 during the time the burst gate pulse remains "H". An output of the maximum value holding circuit 4 (maximum value $A^2_{max}$) is transmitted to a comparator 9.

If the burst gate pulse goes low "L", counter 5 counts the sampling clocks to output a count value $C_n$. Also the counter 5 is reset when the burst gate pulse goes high "H".

The count value $C_n$ of the sampling clocks, outputted from counter 5 when the burst gate pulse becomes "L", is transmitted to a delay circuit 6 while being simultaneously supplied to the fixed terminal b of the selector 11. At this time, the selector 11 has its movable contact set to the side of the fixed terminal b when the burst gate pulse becomes "L", so that the count value $C_n$ from the counter 5 is transmitted via selector 11 to multiplier 2.

The count value $C_n$, transmitted to multiplier 2, is squared by the multiplier 2 ($C_n^2$) and subsequently transmitted to the additive node 3 and to the delay circuit 12. The additive node 3 adds the output data $C_n^2$ of the multiplier 2 to the squared value $C_{n-1}^2$ of the count value preceding the above count value $C_n$ by one clock. An output ($C_n^2 + C_{n-1}^2$) of the additive node 3 is supplied to a ½ processing circuit 8. Meanwhile, the maximum value holding circuit 4 is not in operation because the burst gate pulse is "L".

The ½ processing circuit 8 performs an operation of finding a halved value of the output data ($C_n^2 + C_{n-1}^2$), that is ($C^2 = (C_n^2 + C_{n-1}^2)/2$). That is in the ½ processing circuit 8 a halved value of the sum of the squared values of the two consecutive count values outside the burst gate pulse period is found. An output $C^2$ of the ½ processing circuit 8 is supplied to the comparator 9.

The comparator 9 compares the maximum value $A^2_{max}$ from the maximum value holding circuit 4 to the output $C^2$ from the ½ processing circuit 8 from time to time. The comparator 9 outputs, when the output $C^2$ from the ½ processing circuit 8 becomes larger than the maximum value $A^2_{max}$ from the maximum value holding circuit 4, a signal which is changed in level to high "H" front low "L". This output signal is supplied to a latch circuit 7.

The latch circuit 7 is supplied with the count value $C_{n-1}$ from counter 5 delayed by the delay circuit 6 which introduces a one-clock delay to its input signal. That is, when the burst gate pulse becomes "L" and the squared value $C^2$ of the count value of the counter 5 becomes larger than the maximum value $A^2_{max}$, the first of the two consecutive count values, that is the count value $C_{n-1}$, is stoned by the latch circuit 7. The data of the latch circuit 7 is the count value of the counter 5 which temporally precedes the squaring operation by the multiplier 2. In the present embodiment, the count value $C_{n-1}$ is employed as an approximate value of the square root of the burst level ($A^2_{max}$). The output of the latch circuit 7 is outputted at an output terminal 15 as a level detection output of the present level detection circuit.

Figure 6:
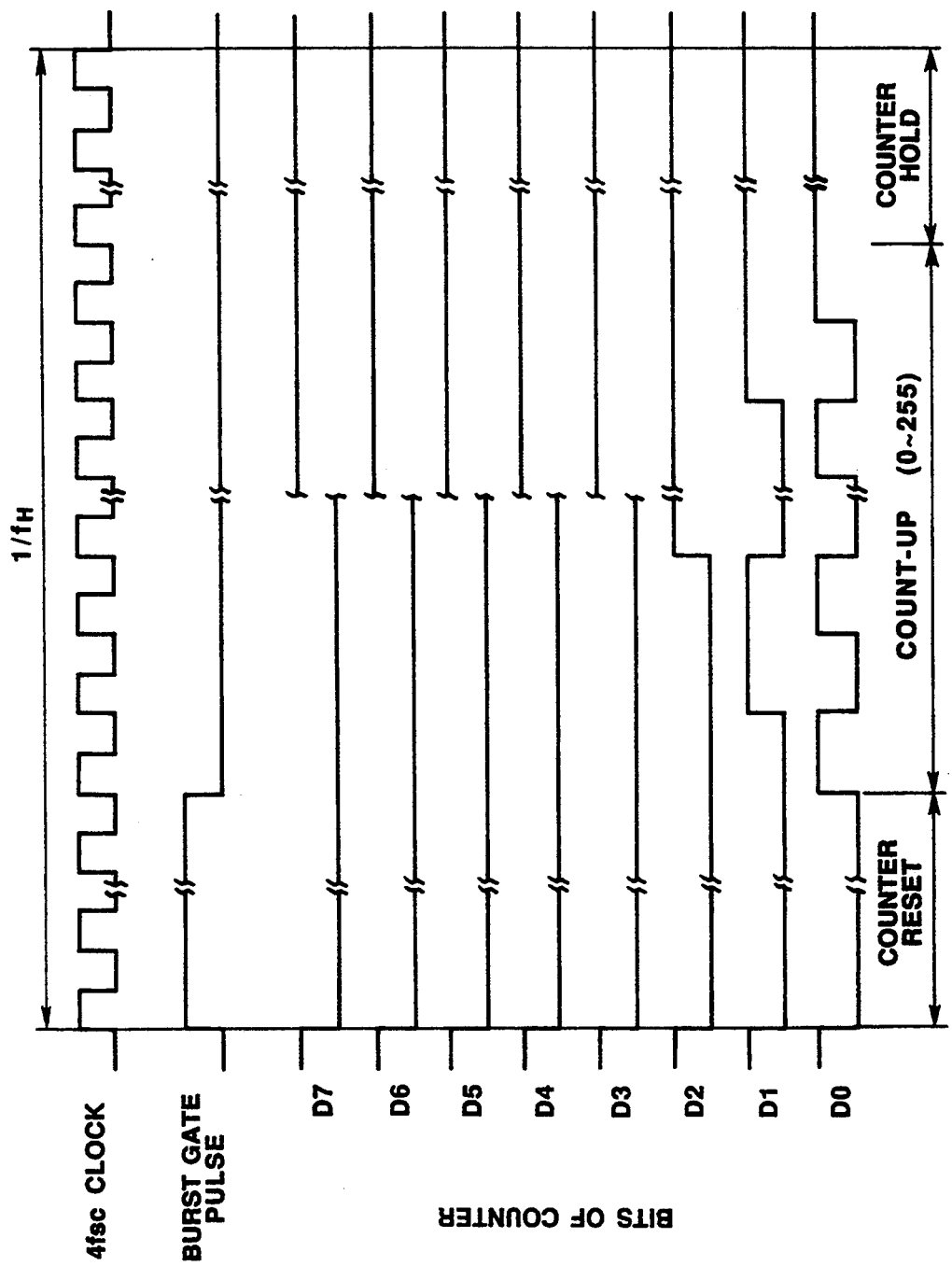
FIG. 6 is a timing chart showing waveforms of signals appearing at a counter.

Meanwhile, with standardized signals, such as television signals, the frequency of the burst signal $f_{SC}$ and the frequency of the horizontal synchronization signal $f_H$ are related to each other by a formula 4 $f_{SC} = 910 f_H$. That is, if the sampling frequency $f_s$ is set for example to $f_s = 4 f_{SC}$, there are 910 clocks having the frequency of $f_s$ between adjacent horizontal synchronization signals. On the other hand, since the A/D converter is of an 8-bit type, the counter 5 of an 8-bit type suffices for measuring the burst signal level. Since the 8-bit counter 5 is employed in the present embodiment, and $2^8 = 256$, the burst level may be measured while a 256 number of clocks having the frequency of $f_s$ are counted during a $1/f_H$ interval. That is, the burst level detection is achieved during a count-up interval of counter 5, as may be seen from a timing chart of FIG. 6. It may be seen from FIG. 4 that counter 5 counts clocks having the frequency of $4 f_{SC}$ and directly outputs the count value.

It is noted that, when the count value of the counter 5 is squared and the resulting squared value is compared by comparator 9 to the maximum value $A^2_{max}$, a processing of $C^2 = (C_n^2 + C_{n-1}^2)/2$ is carried out in the ½ processing circuit 8. Alternatively, the squared value $C_{n2}$, obtained by squaring the output of counter 5 by multiplier 2, may be directly supplied to comparator 9 without being transmitted through additive node 3, delay circuit 12 and ½ processing circuit 8. However, in this case, the level detection output of the latch circuit 7 as an approximate value of ($A^2_{max}$) becomes slightly lower in accuracy.

Figure 7A:
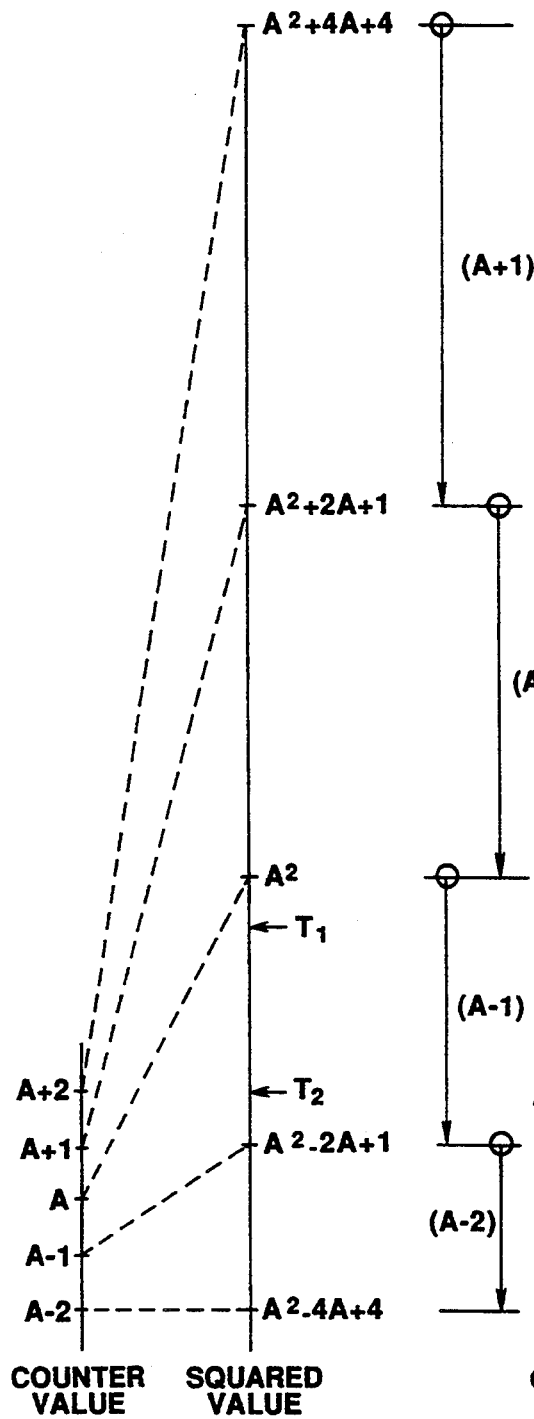
FIGS. 7(a) and 7(b) are diagrams showing counter values and corresponding squared values, in accordance with the invention.

Referring to FIG. 4, which is a level chart for detection of the ACC level the accuracy of ($A^2$) is hereinafter explained First as shown in FIG. 7(a), when the maximum value $A^2_{max}$ is directly compared to the squared value $C_n^2$ of th n'th count by the counter 5 for producing an approximate solution of $\sqrt{(A^2_{max})}$ the count value of counter 5 is stored for $C_n = A$ when the maximum value $A^2_{max}$ is produced at time $T_1$, so that $\sqrt{(A^2_{max})}$ is approximately equal to $A - 1$. This applies when the maximum value $A^2_{max}$ is produced at time $T_2$ as well.

On the other hand, when the mean value $C^2$ of the sum of the squared values $C_n^2$ and $C_{n-1}^2$ of counter 5 is compared to the above-mentioned maximum value $A^2_{max}$, the count value of counter 5 is stored for $c_n = A + 1$ when the maximum value $A^2_{max}$ is produced at time $T_1$, so that $\sqrt{(A^2_{max})}$ is approximately equal to A. On the other hand, the count value of counter 5 is stored for $c_n = A$ when the maximum value $A^2$ is produced at time $T_2$, so that $\sqrt{(A^2_{max})}$ becomes approximately equal to $A - 1$.

Figure 7B:
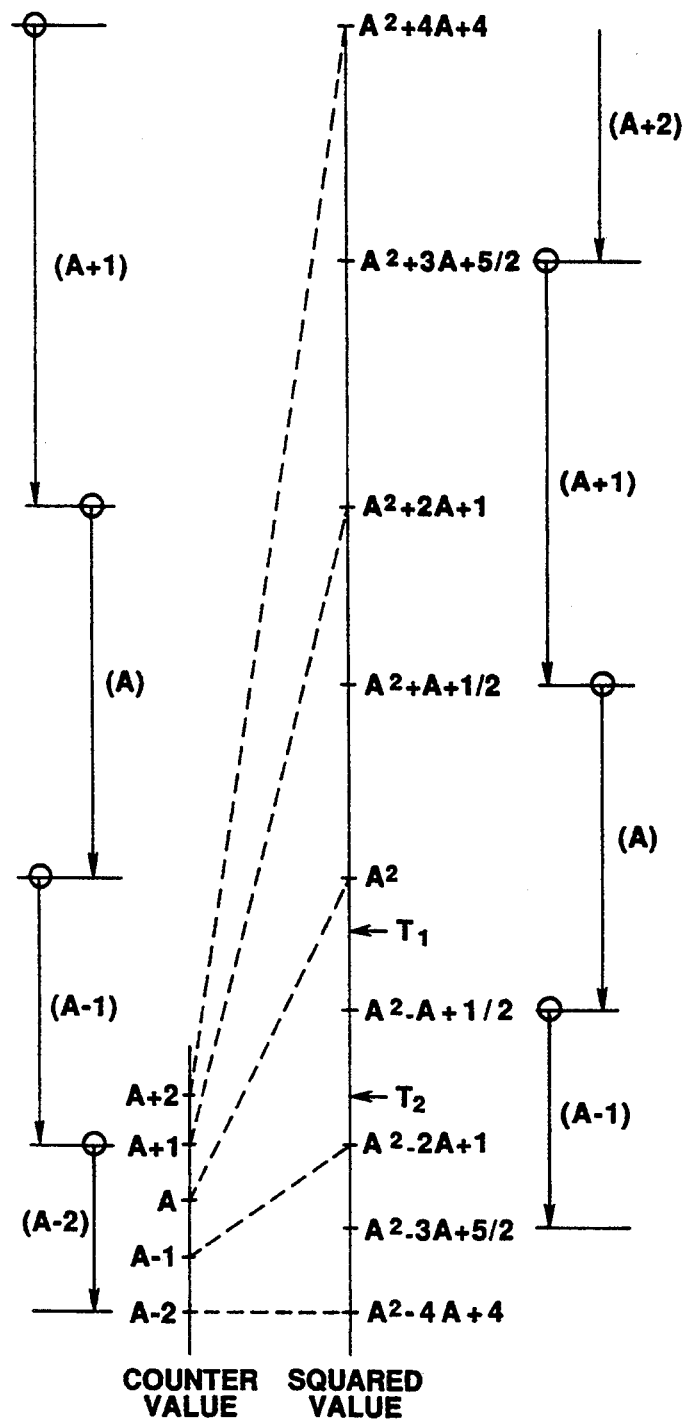

It is seen from FIG. 7(a) that the value of $\sqrt{(A^2_{max})}$ for time $T_1$ is approximate to A while the value of $\sqrt{(A^2_{max})}$ for time $T_1$ is approximate to $A - 1$, so that the value of $\sqrt{(A^2_{max})}$ becomes higher in accuracy when the operation of $C^2 = (C_n^2 + C_{n-1}^2)/2$ as indicated FIG. 7(b) is carried out.

From the foregoing it is seen that the level detection circuit of the present invention performs a calculation of finding a squared value by counter 5, and compares the squared value to a value a square root of which is to be found to set the value of counter 5 as a square root, so that the circuit for finding a square root may be reduced in size to permit level detection using this small-sized circuit.

While specific embodiments of the present invention have been shown and disclosed, it is to be understood that numerous changes may be made by those skilled in the art without departing from the scope and intent of the invention.

What is claimed is

1. A signal level detection circuit for detecting when a level of an input signal is exceeded by a reference level comprising:

first square value computing means for receiving said input signal and computing a squared value representing the level of said input signal squared;

a counter for counting predetermined clock sampling pulses to produce a count value;

second square value computing means for receiving said count value from said counter and computing a squared value of said count value representing said reference level; means for providing a burst gate pulse;

switch means, responsive to said burst gate pulse, for selectively supplying said input signal to said first square value computing means and said count value to said second square value computing means; and level decision means for producing an output when an output of said second square value computing means exceeds an output of said first square value computing means.

2. A Signal level detection circuit for detecting when a level of an input signal is exceeded by a reference level comprising:

first square value computing means for receiving said input signal and computing a squared value representing the level of said input signal squared;

a counter for counting predetermined sampling clock pulses to produce a count value;

second square value computing means for receiving said count value from said counter and computing a half value of the sum of two consecutive ones of said count values, said half value representing said reference level; means for providing a burst gate pulse;

switch means, responsive to said bust gate pulse, for selective supplying said input signal to said first square value computing means and said count value to said second square value computing means; and level decision means for producing an output when an output of said second square value computing means exceeds an output of said first square value computing means.

3. A signal level detection circuit for detecting when a level of a burst signal having a frequency $f_{SC}$, is exceeded by a reference level comprising an A/D converter for sampling said burst signal with sampling clock pulses at a frequency of 4 $f_{SC}$, first square value computing means receiving output data of said A/D converter for computing a sum of squared values of two consecutive output data of said A/D converter;

a maximum value holding circuit for holding a maximum value of outputs of said first square value computing means within a burst gate pulse period of a burst gate signal fed thereto;

a counter for counting said sampling clock pulses to produce a count value, said counter being reset by said burst gate pulse;

second square value computing means for receiving two consecutive count values from said counter and computing a half value of the sum of said two consecutive count values outside said burst gate pulse period, said half value representing said reference level; means for providing said burst gate signal a switch means, responsive to said burst gate signal, for selectively supplying said output data from said A/D converter to said first square value computing means and said count value to said second square value computing means; and level decision means for producing an output when an output of said second square value computing means becomes larger than the output of said maximum value holding means.

4. The level detection circuit as claimed in claim 3 wherein said first square value computing means comprises:

multiplication means for squaring an output of said A/D converter, delay means for delaying an output of said multiplication means by one clock period, and addition means for adding an output of said multiplication means and an output of said delay means.

5. The level detection circuit as claimed in claim 3 wherein said first square value computing means comprises:

multiplication means for squaring said clock count, delay means for delaying an output of said multiplication means by one clock period, addition means for adding an output of said multiplication means and an output of said delay means, and processing means for computing a half value of an output of said addition means.

6. The level detection circuit as claimed in claim 3, wherein said level decision means comprises:

delay means for delaying an output of said counter by one clock period;

latch means for latching an input signal fed thereto in response to an output of said delay means; and comparator means for supplying said input signal to said latch means when the output of said second square value computing means exceeds the output of said maximum value holding means.

7. An ACC circuit for controlling the chroma level of an image signal containing a burst signal having a frequency $f_{SC}$, comprising multiplication means for multiplying said image signal with a multiplication coefficient;

an A/D converter for sampling an output of said multiplication means with sampling clock pulses at a frequency of 4 $f_{SC}$;

first square value computing means for computing a sum of squared values of two consecutive output data from said A/D converter;

a maximum value holding circuit for holding a maximum value of outputs from said first square value computing means within a burst gate pulse period;

a counter for counting said sampling clock pulses to produce a count value, said counter being reset by a said burst gate pulse;

second square value computing means for receiving two consecutive count values from said counter and computing a half value of the sum of said two consecutive count values outside said burst gate pulse period;

a switch, responsive to said burst gate pulse, for selectively supplying said output data from said A/D converter to said first square value computing means and said count value to said second square value computing means;

level decision means for supplying an output when an output of said second square value computing means becomes larger than an output of said maximum value holding means;

addition means for adding an output of said level decision means to a predetermined reference signal; and integrating means for integrating an output of said addition means for generating said multiplication coefficient fed to said multiplication means.

8. The ACC circuit as claimed in claim 7 wherein said first square value computing means comprises:

a multiplier for squaring output data from said A/D converter, delay means for delaying an output of said multiplier by one clock pulse period, and an adder for adding an output of said multiplier and an output of said delay means.

9. The ACC circuit as claimed in claim 7 wherein said second square value computing means comprises:

a multiplier for squaring said count value, delay means for delaying an output of said multiplier by one clock pulse period, an adder for adding an output of said multiplier and an output of said delay means, and processing means for computing a half value of an output of said adder.

10. The ACC circuit as claimed in claim 7 wherein said level decision means comprises delay means for delaying an output of said counter by one clock pulse period;

latch means for latching an input signal fed thereto in response to an output of said delay means; and comparator means for supplying said input signal to said latch means when the output of said second square value computing means exceeds the output of said maximum value holding means.

* * * * *

UNITED STATES PATENT AND TRADEMARK OFFICE
CERTIFICATE OF CORRECTION

PATENT NO. : 5,392,074
DATED : February 21, 1995
INVENTOR(S) : Kazuo Watanabe, Hirofumi Todo and Takaya Hoshino It is certified that error appears in the above-indentified patent and that said Letters Patent is hereby corrected as shown below:

Col. 1, line 10, change "the" to --a--
same line, change "recorded" to --recorder--
line 11, change "Color" to --color--
lines 43 & 44, change "outpost" to --output--
line 53, change "22" to --23--

Col. 2, line 1, after "burst" delete ","
line 36, after "input" delete ","

Col. 3, line 67, change "court%" to --count--

Col. 5, line 7, after "that" delete ","
line 9, after "burst" delete ","

line 33, change "$C^{n2}$" to --$C_n^2$-- line 43, after "8" insert --,--
line 63, change "stoned" to --stored--

Col. 6, line 36, after "level" insert --,-- same line, change "$(A^2)$" to --$(A^2_{max})$-- line 37, after "explained" insert --.--
line 38, after "First" insert --,-- line 42, after "$(A^2_{max})$" insert --,-- line 58, after "A" insert --,--
line 61, after "indicated" insert --in--

UNITED STATES PATENT AND TRADEMARK OFFICE
CERTIFICATE OF CORRECTION

PATENT NO. : 5,392,074
DATED : February 21, 1995
INVENTOR(S) : Kazuo Watanabe, Hirofumi Todo and Takaya Hoshino It is certified that error appears in the above-indentified patent and that said Letters Patent is hereby corrected as shown below:

In the Claims:

```
Col. 7, line 20, "means" should start a new paragraph
        line 31, change "Signal" to --signal--
        line 43, "means" should start a new paragraph
        line 46, change "selective" to --selectively--
        line 56, after "comprising" insert --:--
Col. 8, line 9, "means" should start a new paragraph
        line 10, after "signal" insert --;--
        line 52, after "comprising" insert --:--
        line 66, delete "said"
Col. 10, line 15, after "comprises" insert ":"
```

Signed and Sealed this

Nineteenth Day of March, 1996

Attest:

BRUCE LEHMAN

Attesting Officer         Commissioner of Patents and Trademarks